(12) United States Patent
Glejbøl et al.

(10) Patent No.: US 7,842,149 B2
(45) Date of Patent: Nov. 30, 2010

(54) METHOD OF MANUFACTURING A REINFORCEMENT ELEMENT FOR A FLEXIBLE PIPELINE

(75) Inventors: Kristian Glejbøl, Glostrup (DK); Jakob Wedel-Heinen, Charlottenlund (DK)

(73) Assignee: NKT Flexibles I/S, Brondby (DK)

( * ) Notice: Subject to any disclaimer, the term of this patent is extended or adjusted under 35 U.S.C. 154(b) by 767 days.

(21) Appl. No.: 11/545,164

(22) Filed: Oct. 10, 2006

(65) Prior Publication Data

US 2007/0062633 A1 Mar. 22, 2007

Related U.S. Application Data

(63) Continuation of application No. 10/478,948, filed as application No. PCT/DK02/00355 on May 23, 2002, now abandoned.

(30) Foreign Application Priority Data

May 23, 2001 (DK) .................. PA 2001 00832

(51) Int. Cl.
*B32B 37/00* (2006.01)
(52) U.S. Cl. .................. 156/169; 156/173; 156/175
(58) Field of Classification Search .............. 156/173, 156/172, 175, 169
See application file for complete search history.

(56) References Cited

U.S. PATENT DOCUMENTS

| | | | |
|---|---|---|---|
| 3,616,123 A | 10/1971 | Reynolds, Jr. et al. | |
| 4,213,487 A | 7/1980 | Funk et al. | |
| 4,345,959 A * | 8/1982 | Asai et al. | 156/244.11 |
| 4,604,319 A * | 8/1986 | Evans et al. | 442/164 |
| 5,225,019 A * | 7/1993 | Huvey | 156/173 |
| 5,609,806 A * | 3/1997 | Walsh et al. | 264/136 |
| 5,939,340 A | 8/1999 | Gabbay | |

(Continued)

FOREIGN PATENT DOCUMENTS

FR 2312356 A * 12/1976

(Continued)

OTHER PUBLICATIONS

Encyclopedia of Polymer Science and Engineering, vol. 1: Adhesive Compositions, pp. 547-549, Aug. 1985.

*Primary Examiner*—Jeff H Aftergut
(74) *Attorney, Agent, or Firm*—Pearne & Gordon LLP

(57) ABSTRACT

For use in the manufacture of reinforcement layers for flexible pipes which are capable of absorbing compressive or tensile forces, and which are used for the transport of oil and gas, a thermoplastic material is applied to a strength-imparting layer. The strength-imparting layers are reeled on reels, and following unreeling they are laminated by application of heat and in direct continuation applied to the flexible pipe. The strength-imparting layer expediently consists of a polymer which is reinforced with at least 20% by volume of fibres. The thermoplastic material is of a reversible type, i.e. it may change from being relatively soft, but non-sticky by changes in temperature. The use of the method according to the invention allows manufacture of very strong reinforcements for flexible pipes which cannot be manufactured using a solid material, such as steel, since high performing bending forces are required in the shaping. In addition, a reinforcement element is provided which is capable of resisting instantaneous shock loads as the thermoplastic material is protective.

9 Claims, 1 Drawing Sheet

U.S. PATENT DOCUMENTS

2002/0098311 A1    7/2002    Lindner

FOREIGN PATENT DOCUMENTS

Figure 1:
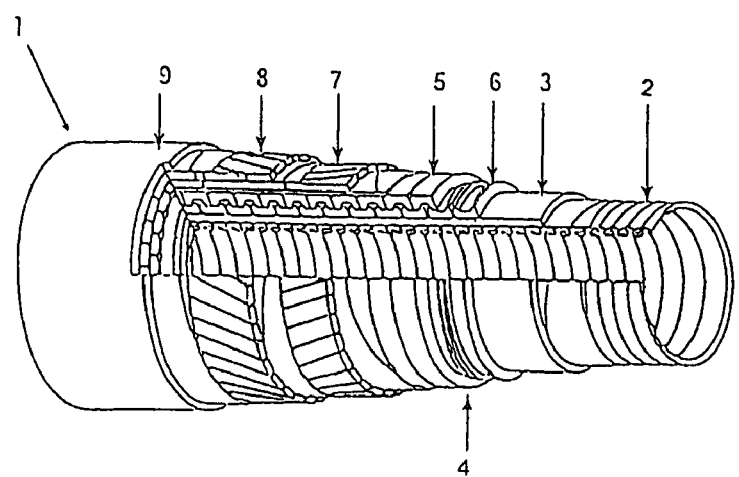

| JP | 60-72707 A | * | 4/1985 |
| WO | WO-99/67561 A1 | * | 12/1999 |
| WO | WO 00 36324 | | 6/2000 |
| WO | WO-00/66927 A1 | * | 11/2000 |
| WO | WO 01 61231 | | 8/2001 |

* cited by examiner

METHOD OF MANUFACTURING A REINFORCEMENT ELEMENT FOR A FLEXIBLE PIPELINE

CROSS-REFERENCE TO RELATED APPLICATION

This is a continuation of U.S. patent application Ser. No. 10/478,948 filed Nov. 24, 2003, now abandoned, which was the national stage of International Application No. PCT/DK02/00355 filed 23 May 2002, the contents of which are herein incorporated by reference.

The invention relates to a method of manufacturing a reinforcement element for a flexible pipeline, a reinforcement element for a flexible pipeline, and a precursor therefore.

Flexible pipes containing reinforcement elements are known e.g. from JP 3265781, FR 2764669 and WO 00/36324. Such pipes are typically used for the transport of oil and gas in deep waters or waters of varying depth.

An example is pipes which are used for the transport of hydrocarbon from a subsea installation to an installation at the surface of the sea. For such pipes, extremely high requirements are made with respect to the reinforcement, since the pipes are subjected to great static and dynamic mechanical loads along their axes. These loads originate partly from the external pressure application caused by varying external water pressures, partly tensile forces caused by the own weight of the pipe, and partly forces caused by the positive pressure by which the fluid flowing in the pipe affects the pipe.

The manufacture of strength-imparting layers of the type defined in the introductory portion of claim 1 is described in WO 00/66927. According to WO 00/66927 a glue is applied between a plurality of strength imparting layers, following which they are wound with a tape such that the layers are kept together while the glue hardens.

This method ensures that while the glue hardens, the layers are only kept together by the wound tape, which is not capable of absorbing transverse stresses to any significant degree. The effect of this is that the layers kept together can slide over each other to a certain degree, and the resulting reinforcement element can therefore be configured within certain limits while the glue has still not hardened. After hardening, further sliding of the layers over each other will no longer be possible, and the combined layers will therefore constitute a rigid reinforcement element.

As the layers are locked to each other after hardening of the glue, this method requires that the reinforcement element made of the layers is configured to the final shape before the applied glue has hardened.

It is additionally noted that the advantage of applying the reinforcement element as a plurality of layers on the pipe is that it is hereby possible to apply the elements without any significant mechanical residual stresses occurring in the finished elements.

However, a number of manufacturing problems are associated with the manufacturing method of WO 00/66927 described above, the most important problems of which are caused by the wound tape that keeps the individual layers of the reinforcement element together during hardening.

If a reinforcement element thus manufactured is to be repaired after final application to the pipe, it will not be possible to apply the wound tape again, resulting in a discontinuity in the reinforcement element.

A further drawback of the above method is that during manufacture and repair of reinforcement elements it will be extremely difficult to separate the individual layers from each other, which excludes repairs, splicing and terminations of the individual reinforcement elements in practice.

In addition to the problems mentioned above, the known manufacturing method described here is additionally complicated by the risk that juxtapositioned reinforcement elements adhere to each other if excess glue is not removed prior to the application to the pipe.

Accordingly, an objective of the invention is to provide a structure of reinforcement elements for use in the manufacture of flexible pipelines which is not limited by the problems mentioned above.

This objective has been achieved by the invention as it is defined in the claims.

The invention thus includes a method of manufacturing precursor for a reinforcement element for a flexible pipeline, including the step of applying a thermoplastic layer to the reinforcement element, which consists of at least one strength-imparting layer, on at least one face thereof.

One or more precursors may thereafter be laminated with each other and/or other strength-imparting layer or layers to form a final reinforcement element.

This provides the advantage that the individual strength-imparting layers in a reinforcement element may be manufactured as an independent product which may be stored and later be included in the manufacture of a reinforcement element for a flexible pipeline.

The reinforcement element and the strength-imparting layer(s) may e.g. be as described below.

The invention also relates to a method of manufacturing a reinforcement element for a flexible pipeline, wherein the reinforcement element comprises two or more strength-imparting layers, e.g. 3, 4, 5, or more such as up to about 10 or even 20 strength-imparting layers. The method includes a step of applying a thermoplastic layer to at least one of the strength-imparting layers, on at least one face thereof, followed by a lamination with another strength-imparting non-thermoplastic layer.

The strength-imparting non-thermoplastic layer or layers may in one embodiment be as the fiber based tapes described in WO 0066927 which is hereby incorporated by reference.

It is in most situations desired that the strength-imparting layers are in the form of tape shaped units having two major sides.

The strength-imparting layer may in principle be of any material such as metals and fiber reinforced polymers. Basically it is preferred that the strength-imparting layer is a non-thermoplastic layer not made from any thermoplastic polymer, but in one embodiment it may contain small amounts e.g. up to about 10% by weight of a thermoplastic polymer provided that this thermoplastic polymer has a lower $t_g$ value than the thermoplastic layer applied onto or in between the strength-imparting layers.

In one embodiment the strength-imparting layers are made from materials as disclosed in WO 0066927.

In one embodiment the strength-imparting layer or layers are in the form of a polymer reinforced with at least 20% by volume, such as 30% by volume of fibres or whiskers, such as carbon fibres or mineral fibres.

The fibres may be randomly distributed or they may be oriented. In one embodiment the major part of the fibres has orientations along the length of the shaped strength-imparting layer or layers.

The length of the fibres may influence the strength of the strength-imparting layer. In one embodiment the fibres are endless along the strength-imparting layer, wherein the term "endless" designates that the major part of the fibres extends along length above 10 cm, such as 100 cm in the direction along the length of the strength-imparting layer.

In another embodiment the strength-imparting layer or layers are in the form of a fully or partly metallic material.

In one embodiment thermoplastic layers are applied onto one of the major faces of at least half of the strength-imparting layers. This application of thermoplastic material is in one embodiment carried out before the lamination process where further strength-imparting layer or layers are laminated. In another embodiment this application of thermoplastic material is carried out during the lamination process so that thermoplastic material is applied onto one major surface of a first strength-imparting layer, a second strength-imparting layer is applied onto the thermoplastic layer, the free major surface of the second strength-imparting layer is coated with a thermoplastic material and so on.

During the coating and lamination processes, the thermoplastic material should be sufficiently soft to be moldable and to be capable of adhering to the strength-imparting layers. Therefore it is desired to perform the coating and lamination processes at elevated temperature e.g. above 100° C., above 150° C. or even higher. In one embodiment the coating and lamination processes are carried out at temperatures above the thermoplastic $t_g+10°$ C. In another embodiment the coating and lamination processes are carried out at a temperature below 100° C. and the thermoplastic material has immediately before the application been heated to above the thermoplastic $t_g+10°$ C., such as above the thermoplastic $t_g+100°$ C.

In one embodiment the thermoplastic material are in the form of a thermoplastic polymer reinforced with fibres or whiskers, e.g. at least 20% by volume, such as 30% by volume of. The fibres or whiskers may e.g. be carbon fibres or mineral fibres.

The fibres in the thermoplastic material layer applied onto or between adjacent layers of strength-imparting layers, may be randomly distributed or they may be oriented. In one embodiment the major part of the fibres has orientations perpendicular to the length of the shaped strength-imparting layer or layers.

In one embodiment, the reinforcement element has at least two strength-imparting layers, and a thermoplastic material is applied to the adjoining faces of at least one of the two strength-imparting layers.

In one embodiment heat is supplied to the strength-imparting layers during the lamination process. This method is particularly useful in situation where the strength-imparting layer or layers are of a material with a high heat conductivity such as a metal, e.g. steel, aluminum or composite materials comprising metal.

In one embodiment, the reinforcement element has at least two or more such as a plurality of strength-imparting layers, and the method includes the application of a thermoplastic material to the adjoining faces of at least one of the two strength-imparting layers.

In one embodiment, the thermoplastic material is crosslinked after the lamination step, whereby it changes its state from being thermoplastic to being thermosetting.

The method may in one embodiment comprise a step of applying an energy-dissipating layer to at least one of the outer surfaces of the reinforcement element. Thereby energy caused by shock loads may be dissipated, which is important particularly if the flexible pipe is of the type to which is applied a reinforcement layer exposed freely to the surroundings, i.e. a pipe without protective sheath.

One or more energy-dissipating layers may further be applied between strength-imparting layers.

An energy-dissipating layer means a layer having a shore hardness, which is lower than the shore hardness of the strength-imparting layers of the reinforcement-element. In one embodiment the energy-dissipating layer has a shore hardness, which is at least 5%, such as at least 10 lower than the shore hardness of the strength-imparting layers of the reinforcement-element.

The energy-dissipating layer may in one embodiment be of a polymeric material such as an epoxy polymer.

In one embodiment of the invention the reinforcement element consists of a plurality of strength-imparting layers, and these layers are reeled on a reel, and prior to or during reeling, they are given a shape which approximately has the final curvature of the reinforcement layer. By using a reinforcement element of this embodiment in the production of long pipes having tensile reinforcement elements, this production has become easier and more cost-effective compared to similar production of long pipes using prior art reinforcement elements.

By providing the reinforcement element comprising a plurality of strength-imparting layers with a shape which approximately has the final curvature of the reinforcement layer, it is ensured that the tensile reinforcement layer is essentially tension-free after application to the flexible pipe.

After cooling, the reinforcement element may be applied or be reeled for subsequent use.

In the embodiment of the method of the invention comprising the step of reeling the reinforcement element onto a reel, this is preferably done under circumstances where the thermoplastic material is sufficiently soft to adapt to the form provided during the reeling so that the reinforcement element obtains a shape which includes a curvature. In one embodiment it is desired that the shape corresponds to the final curvature of the reinforcement element.

The method of the invention may include the step of applying the reinforcement element. In one embodiment the method therefore includes the steps of manufacturing a plurality of flat profiles, such as tape-shaped profiles of a fibre-reinforced thermosetting polymer e.g. in a pultrusion process applying a thermoplastic polymer material, e.g. in a thickness of about 100 μm, 200 μm or 300 μm, to the flat profiles reeling the flat profiles on a plurality of reels unreeling the flat profiles from a plurality of reels, and then laminating them during application of heat in immediate continuation of the lamination process, such as before the thermoplastic material solidifies, winding the flat profiles on the flexible pipe, which now constitutes a reinforcement element for the flexible pipe.

In an alternative method the reinforcement element is reeled onto a bobbin or similar strong device, and later it is unwound under the application of heat and applied onto a flexible pipe.

In another alternative embodiment, the thermoplastic layer is applied immediately before the final application. In this embodiment, the thermoplastic layer may be applied either as a film, which is subsequently melted, or as a sprayed layer.

The invention also relates to a precursor for a reinforcement element for a flexible pipeline. The precursor comprises a strength-imparting, preferably non-thermoplastic layer comprising two major faces, having on at least one of its major faces a layer of a thermoplastic material.

The strength-imparting non-thermoplastic layer and the thermoplastic layer may be as described above and furthermore the precursor may be provided according to the method described above.

By the precursor it is further obtained that a reinforcement element having the desired strength easily can be provided by selecting the number of strength-imparting layers in relation to the desired strength. Thereby mass production of the precursor for final production of different reinforcement elements with different strengths is possible.

Finally the invention relates to a reinforcement element for a flexible pipeline. The reinforcement element comprises two or more strength-imparting preferably non-thermoplastic superimposed layers. The two or more strength-imparting superimposed layers are fixed to each other by intermediate layer or layers of thermoplastic material.

The strength-imparting layer and the thermoplastic layer may be as described above and furthermore the precursor may be provided according to the method described above.

The reinforcement element according to the invention is simple to manufacture, easy to handle under the application onto a flexible pipe, and further it is easy to repair.

Figure 2:
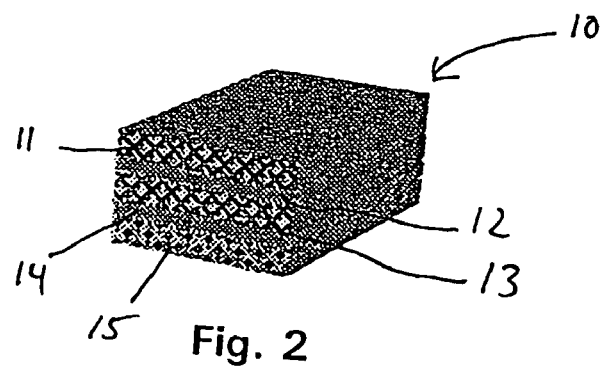
Figure 3:
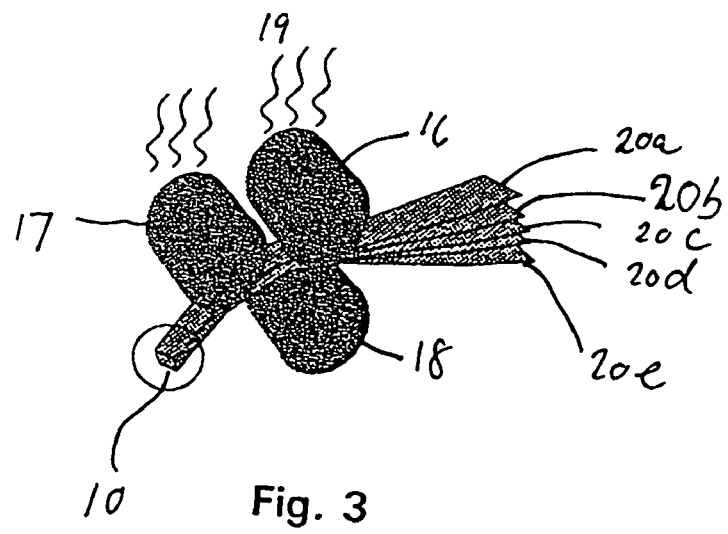

Additional expedient embodiments will now be explained with reference to the embodiment illustrated in the drawing, in which FIG. 1 shows the structure of an ordinary flexible pipe with reinforcement layers, FIG. 2 schematically shows a small part of the structure of a reinforcement layer according to the invention, while FIG. 3 schematically shows a subprocess in the application of a reinforcement layer using one or more strength-imparting layers according to the invention.

In FIG. 1, 1 designates a flexible pipe, e.g. for the transport of fluids such as oil and gas between offshore installations and installations near oil wells on the sea bed.

According to local conditions, such as the depth of the sea and the temperature of the fluid which is to be transported, it is important that the pipes have the necessary mechanical and physical properties which ensure that the pipes are not destroyed in use.

The flexible pipe in FIG. 1 consists of a tight liner 3 on whose inner side a so-called carcass 2 formed by wound steel profiles is provided. The carcass 2 protects the liner against collapse because of external compressive forces, which may e.g. occur because of hydrostatic pressures.

Two types of reinforcement layers are arranged externally on the liner, of which the layer 5, 6 positioned closest to the liner is a compression reinforcement layer that consists of coupled profiles which may be of the Z-, C-, X- or K-type.

The compression reinforcement layer has arranged externally thereon a tensile reinforcement layer which consists of helically wound profiles 7, 8 which are wound almost symmetrically relative to the longitudinal axis of the pipe, e.g. at an angle of about 55°, and such that the layers 7, 8 are wound oppositely to each other.

Finally, an outer jacket 9, which is tight in some cases, but not necessarily so, is applied externally to the tensile reinforcement layer.

In addition, there may be further layers (not shown) on the pipe 1 which have specific functions in relation to a specific use.

The above-mentioned layers are not chemically bonded to each other, which means that the pipe is flexible and can thus be bent. Such pipes are therefore also referred to as being unbonded.

FIG. 2 shows a small section of the structure of a strength-imparting layer 10 according to the invention, which may e.g. be used for the tensile reinforcement layer 7 or 8 in FIG. 1.

As will be seen, the layer 10 is composed as a laminate, where 12 and 14 designate layers which do not exhibit any considerable thermoplastic be-haviour, such as e.g. steel tapes or profiles of a carbon/epoxy composite, while 11, 13 and 15 designate a thermoplastic material.

The thermoplastic material has the property that it may be present in both a melted and a solid phase, and that reversible switching between the phases is possible by control of the temperature.

For example, it may be fairly rigid like hard rubber at a given temperature, while at a higher temperature it can approach a liquid state. In contrast, the layer used as a reinforcement according to WO 00/66927 is a glue which maintains its rigidity after solidification.

It should be observed that nothing prevents the strength-imparting layer from being composed of several layers of strength-imparting layers and layers of thermoplastic material, of course.

As special embodiments, mention may be made of two basic configurations where the first is a laminate consisting of a strength-imparting layer and a thermoplastic layer. Such a structure will be suitable for combination with other laminates of the same type.

Another basic configuration may consist of a strength-imparting layer which may be provided with a thermoplastic layer on each side. Alternatively, one of the two layers may be a ductile material which is suitable as an outer layer in a reinforcement which is to be capable of resisting external impacts, such as shocks or the like. This is important especially if the reinforcement layer is exposed freely to the surroundings.

Since the layer is thermoplastic according to the invention, it can be worked relatively easily. In other words, even reinforcement layers having many layers and thereby a great strength may be reeled in limited amounts, since heating during working causes the thermoplastic layer to become so soft as to allow the steel elements/profiles to move relatively to each other.

If the reinforcement layers are to be used on a long pipe, it may be desired in the manufacture of it that the reinforcement elements are manufactured with a curvature comparable to the curvature which they will describe on the finished pipe. It is important to note that the innermost fibres in a reinforcement layer will describe a shorter distance than the outermost fibres. Thus, if a pipe has wound thereon a straight reinforcement element where the individual strength-imparting layers are locked relative to each other, the winding will therefore cause compressive stresses in the innermost fibres of the reinforcement element. If a reinforcement element according to the invention is wound where the strength-imparting layers are not locked relative to each other (e.g. because of heating), this will cause the layers to move relative to each other. This is in most situations acceptable for short lengths of reinforcement elements, but may be difficult for long lengths, since the practical handling of the accumulated length difference between the individual strength-imparting layers will result in a very difficult manufacturing process.

FIG. 3 schematically shows how a strength-imparting layer may be manufactured according to the invention, where 10 designates a strength-imparting layer which is shown to the right in the figure prior to the lamination process. In the lamination process, non-thermoplastic strength-imparting layers 20a, 20b, 20c, 20d, and 20e are fed from reels (not shown) to reels 16, 17, and 18, where a thermoplastic material is applied from applicator means (not shown) to the non-thermoplastic strength-imparting layers 20a, 20b, 20c, 20d, and 20e shortly before the compression. These applicator means may consist of guides which apply a thermoplastic layer, e.g. in the form of a film, to the strength-imparting layers, or by direct application of molten material by means of small rolls having perforations for discharging thermoplastic material.

EXAMPLE

Pipes for the transport of oil between an installation on the sea bed and a floating installation.

This example describes a freely hanging configuration where the depth of the pipe below the surface of the sea is a monotonically increasing function of the length. In this configuration, the hydrostatic pressure around the pipe therefore increases monotonically along the length of the pipe.

The liner is formed of PVDF and serves to create an effective diffusion barrier between the fluid transported in the pipe and the environment. To prevent unintentional cooling of the transported fluid, the liner has extruded externally thereon a layer of polypropylene whose purpose is to serve as a thermal barrier. Although polypropylene is stated as an example here, numerous other materials and combinations of materials may be used. In particular combinations of materials where syntactic foam is included as a component are conceivably suitable in this application.

To reinforce the liner against a reduction in volume, the interior of the liner is reinforced with a 12 mm thick reinforcement layer which is wound on profiles made of duplex steel.

According to the invention, the external reinforcement is composed of elements which each are made of thin layers of a carbon/epoxy composite bonded together by thermoplastic intermediate layers.

The manufacture of the reinforcement layers starts with a pultrusion process where a plurality of flat strength-imparting layers having the dimensions 0.5×12 mm are manufactured. This pultrusion process comprises manufacture of elements having a fibre content of about 50% by volume. Characteristic of the resulting pultruded product is a high degree of fibre alignment, and this pultruded product therefore has an extremely great strength along the fibre direction. After pultrusion of this strength-imparting layer, it is drawn through a furnace, which ensures complete hardening of the epoxy. Immediately after the passage through the furnace, a solid 200 µm thick thermoplastic polyurethane film is applied. Owing to the high temperature of the strength-imparting layer immediately after the passage through the furnace the polyurethane layer fuses with the strength-imparting carbon/epoxy layer. The strength-imparting layer with applied polyurethane is now reeled and stored.

In the production of a pipe, reinforcement layers are now composed by applying eight strength-imparting layers to the pipe. Immediately prior to winding on the pipe, the eight strength-imparting layers are heated, causing the applied thermoplastic polyurethane to melt. Hereby, the eight layers fuse to a unit. Since this fusion takes place immediately prior to the application to the pipe, the polyurethane layer will be molten at the winding, but will harden immediately after the application to the pipe.

As a result, after solidification, the applied element will essentially have a shape that ensures that there are no mechanical stresses.

The outer reinforcement is wound at angles of about +/−55° relative to the longitudinal axis of the pipe.

To protect the outer reinforcement during laying and operation, a stocking of aramide is woven over the outer reinforcement. This stocking of aramide imparts a great abrasive strength to the pipe, while it is so open to mass transport as to allow a free or almost free transport of fluids to take place through it. Since the aramide stocking is exposed to sunlight, a further cover layer will be applied to pipe lengths which are exposed to UV radiation. This stocking is woven in a manner such that it yields if the pipe is compressed. It is ensured hereby that the tensile reinforcement of the pipe can travel radially if the pipe is subjected to compression in the direction of the axis, whereby the compressive stresses in the reinforcement elements are kept at an acceptable level.

If the pipe is to be used at great depths of sea, a further lacing of the outer reinforcement, e.g. at intervals of 10 metres, will be an advantage, since this lacing will ensure the position of the reinforcement wires relative to the liner, and also allow the radial travel necessary to prevent mechanical stresses.

Clearly, the present invention may be performed in many other ways than those shown above, it being possible to apply the principles of the invention with great latitude within the scope defined by the claims.

The invention claimed is:

1. A method of manufacturing an unbonded flexible pipeline, the method comprising the steps of:
   providing a pipe structure comprising a liner;
   manufacturing a tape shaped reinforcement element, wherein said reinforcement element comprises two or more strength-imparting layer(s) said method comprising providing a precursor for the reinforcement element followed by a lamination of said precursor with another strength-imparting layer, said precursor comprising a strength-imparting layer and one or more thermoplastic layers, said strength-imparting layer of said precursor comprising a fibre-reinforced thermosetting polymer, and said precursor being provided by applying a thermoplastic layer to the strength-imparting layer, on at least one face thereof, wherein the lamination of said precursor with another strength imparting layer occurs after the thermosetting polymer has cured, and
   winding said tape shaped reinforcement element around the pipe structure externally to the liner, wherein the tape shaped reinforcement element is not bonded to the liner.

2. A method according to claim 1, wherein heat is supplied to the strength-imperting layers during the lamination process.

3. A method according to claim 1, wherein the reinforcement element has at least two strength-imparting layers, and a thermoplastic material is applied to the adjoining faces of at least one of the two strength-imparting layers.

4. A method according to claim 1, wherein the thermoplastic material is cross-linked after the lamination step, whereby the thermoplastic material changes state from being thermoplastic to being thermosetting.

5. A method according to claim 1, wherein an energy-dissipating layer is applied to at least one outer surface of the reinforcement element.

6. A method according to claim 1, comprising the step of reeling the reinforcement element onto a reel, under circumstances where the thermoplastic material is sufficiently soft to adapt to the form provided during the reeling so that the reinforcement element obtains a shape which includes a curvature, said shape preferably corresponding to the final curvature of the reinforcement layer.

7. A method according to claim 1, wherein said strength-imparting layers are in the form of a polymer reinforced with at least 20% by volume of fibres or whiskers.

8. A method according to claim 7, wherein said fibres are carbon fibres, said fibres being reinforcement fibres.

9. A method of manufacturing an unbonded flexible pipe, the method comprises the steps of:
- manufacturing a plurality of flat profiles of a fibre-reinforced thermosetting polymer in a pultrusion process;
- applying a thermoplastic polymer material to at least one face of the flat profiles;
- reeling the flat profiles onto reels;
- unreeling the flat profiles, and then laminating them during application of heat to make a reinforcement element, wherein said laminating occurs after the thermosetting polymer has cured; and
- in immediate continuation of the lamination process, winding the reinforcement element on the flexible pipe, which now constitutes a reinforcement element for the flexible pipe, without bonding the reinforcement element to the flexible pipe.

* * * * *

UNITED STATES PATENT AND TRADEMARK OFFICE
CERTIFICATE OF CORRECTION

| | | |
|---|---|---|
| PATENT NO. | : 7,842,149 B2 | Page 1 of 1 |
| APPLICATION NO. | : 11/545164 | |
| DATED | : November 30, 2010 | |
| INVENTOR(S) | : Kristian Glejbol et al. | |

It is certified that error appears in the above-identified patent and that said Letters Patent is hereby corrected as shown below:

In the claims, column 8, line 44, replace "strength-imperting" with -- strength-imparting --

Signed and Sealed this
Third Day of May, 2011

David J. Kappos
*Director of the United States Patent and Trademark Office*